United States Patent
Yoshida et al.

(10) Patent No.: US 6,276,994 B1
(45) Date of Patent: *Aug. 21, 2001

(54) PLASTIC LENS SUBSTRATE AND APPARATUS FOR AND METHOD OF PRODUCING THE SAME

(75) Inventors: Yoshinori Yoshida, Kawasaki; Toshiya Tanaka, Yokohama; Masaharu Ohshima, Kawasaki, all of (JP)

(73) Assignee: Nikon Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/947,105

(22) Filed: Oct. 8, 1997

(30) Foreign Application Priority Data

Oct. 14, 1996 (JP) .................................... 8-271001
Oct. 2, 1997 (JP) .................................... 9-270059

(51) Int. Cl.$^7$ .................................... B24B 1/00
(52) U.S. Cl. .................... 451/41; 451/42; 451/49; 451/65
(58) Field of Search .............. 451/41, 42, 49, 451/65

(56) References Cited

U.S. PATENT DOCUMENTS 5,220,749   6/1993  Youden et al. .
5,693,366 * 12/1997  Mase et al. ................ 427/164

FOREIGN PATENT DOCUMENTS 0 128 779   12/1984  (EP) .
0 453 627   10/1991  (EP) .
0453627 A * 10/1991  (EP) ........................ 451/41

* cited by examiner

Primary Examiner—Joseph J. Hail, III
Assistant Examiner—Shantese McDonald
(74) Attorney, Agent, or Firm—Miles & Stockbridge P.C.

(57) ABSTRACT

A method of the production of a plastic lens substrate is provided which comprises the steps of retaining a starting plastic block material on a processing material retainer, holding a processing tool on a tool holder, the processing tool having a processing end portion dimensioned to be smaller than the dimension of the block material, manipulating the processing tool and/or the block material to thereby subject both of the same to relative movement, and repeating the steps mentioned upon exchange of the processing tool for one for use in subsequent processing. The method leads, in automated manner with improved production efficiency and increased cost saving, to a plastic lens substrate having a lens surface such as a spherical surface, a toric surface, an aspherical surface, a progressive surface, a combination of aspherical and toric surfaces or a combination of progressive and toric surfaces. Also disclosed is an apparatus for producing the lens substrate.

28 Claims, 1 Drawing Sheet

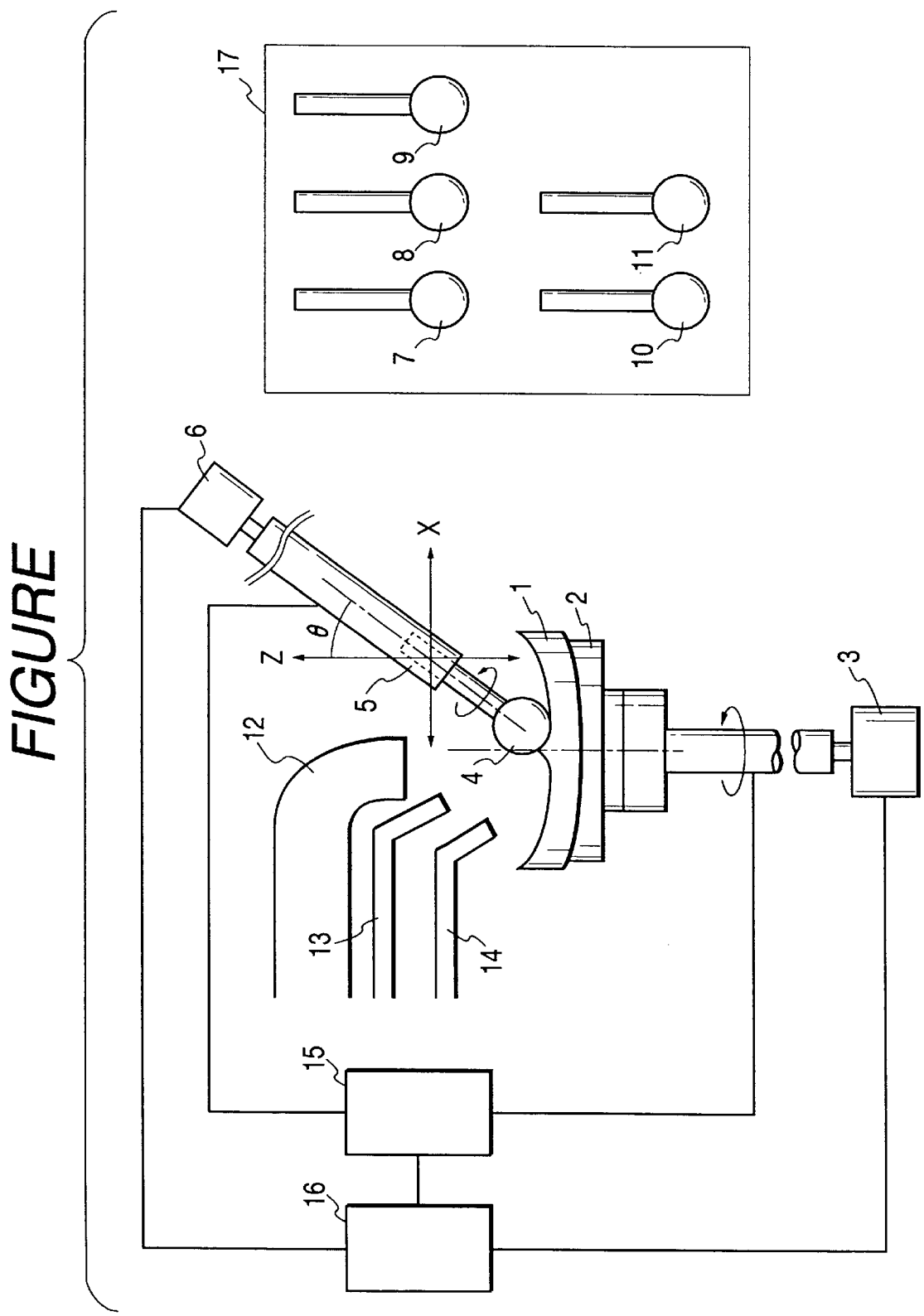
FIGURE

PLASTIC LENS SUBSTRATE AND APPARATUS FOR AND METHOD OF PRODUCING THE SAME

The entire disclosure of Japanese Patent Application Nos. 8-271001 and 9-270059 including specifications, claims, drawing and summaries is incorporated herein by reference in their entirety.

BACKGROUND OF THE INVENTION

1. Field of the Invention

This invention relates to a plastic lens substrate and also to an apparatus for and a method of the production of such lens substrate.

2. Related Background Art

Heretofore, a plastic block material suited as a plastic lens substrate for use in eyeglasses has been produced from processing of one of its two surfaces by means of three processing steps, i.e., grinding, smoothing and polishing. The plastic block material (referred to hereinafter as the block material) denotes a thick-walled lens having already been processed on a convex side but being still required to be processed so as to gain a lens thickness and a concave side as desired. The block material is a so-called semi-finished lens. Details as regards each of the process steps stated above will be described below.

Firstly, the grinding step is intended to cut one selected surface of the block material (hereinafter called a lens forming surface) in such a manner that a desired radius is attained on the lens forming surface. To this end, a diamond wheel is employed which is known as a cup-shaped tool having diamond particles electro-deposited on its grinding face. To conduct the grinding step, the diamond wheel is caused to axially rotate and then brought into movable contact on the particulate diamond-deposited face with the lens forming surface of the block material, while a coolant is being applied to the lens forming surface. The coolant is usually water or an aqueous solution in which a rust preventive, an antifoaming agent and the like are contained.

The smoothing step follows upon completion of the grinding step.

The smoothing step is intended to render fine or smooth the lens forming surface of the block material, which lens forming surface has been cut to a predetermined radius but with some surface roughness through the grinding step. In the conventional practice, the smoothing step is effected by use of an aluminum tray provided with a face having a radius to correspond to that defined on the lens forming surface of the block material. Disposed adhesively over that tray face is a sheet-like polishing medium commonly called a smoothing pad for exclusive use in such a step of smoothing. The aluminum tray mentioned here is known as a processing tray. The processing tray is manipulated to rotate such that during application of a coolant, the polishing medium is allowed to slidably contact with the lens forming surface of the block material.

The block material processed to have reduced surface roughness on the lens forming surface through the smoothing step is thereafter subjected to the polishing step as a finishing operation.

The polishing step contemplates imparting greater fineness or smoothness to the lens forming surface having undergone processing via the smoothing step. Also in the polishing step, use is made of an aluminum tray of the type stated previously in connection with the smoothing step having a face radially shaped to fit the lens forming surface of the block material. A polishing medium (a polishing pad, for example) to be adhesively mounted on the aluminum tray is softer in nature and smaller in mesh than that employed in the smoothing step. The polishing step is achieved by bringing the resulting processing tray into slidable contact with the lens forming surface, while a polishing liquid is being applied to the latter.

In the production of a plastic lens substrate, the block material has been processed on its lens forming surface by means of the three process steps as discussed above. In each such step, each individual exclusive processing apparatus is employed.

To produce a plastic lens substrate for use in glasses, the present inventors have practiced the production apparatus and production method of the prior art, thereby processing a plastic block material. Consequently, these inventors have found that the conventional practice suffers from too long a period of time for processing.

The conventional production method needs a separate processing apparatus so as to carry out each process step of grinding, smoothing and polishing of a plastic block material. Such method, therefore, leads to an increase in equipment cost and in floor space. Additionally, many different processing trays are needed to cope with varying radii desired to be processed in both of the smoothing and polishing steps. Those processing trays cause burdens of time and cost for their preparation. Furthermore, the radii to be processed are dependent upon the formulations of lenses that are variable with the requests to be made by individual users. A large number of radii are required to be satisfied in order to tailor lenses to different users needs. However, because of a great expenditure of time and effort to prepare processing trays, inventories are necessary for those trays of a wide variety. This results in added storage space and increased cost investment in advance. The foregoing problems create an obstacle to improved lens productivity and to saved production cost.

Besides, and disadvantageously, the conventional production method using processing trays requires that the trays be brought into slidable contact with a lens forming surface of a plastic block material with the result that possible processing is limited to a spherical lens and a toric lens.

SUMMARY OF THE INVENTION

Accordingly, the present invention has been made to solve or eliminate the aforementioned problems experienced in the production method of the prior art.

The present inventors have studied the processing of plastic block material using the production method and production apparatus of the prior art.

It takes from one minute to several minutes to complete each of those process steps including grinding, smoothing and polishing. The block material must also be fixed and removed every time each such step is performed. To complete one cycle of the three process steps in processing one block material, the block material must be fixed thrice and removed three times and the processing trays be mounted twice and dismantled twice. It has been found that fixing and removal of the block material as well as mounting and dismantling of the processing trays total up to ten minutes, thus consuming considerable effort and manpower.

Moreover, a pad adhesively attached to the processing tray for use in each of the smoothing and polishing steps must be replaced with a new one every time one block material is completely processed. Releasing of a spent pad and attachment of a fresh pad have been found to be tedious, again consuming considerable effort and manpower.

Still another finding is that it is inconvenient to find a processing tray of a desirable radius out of a wide variety of inventory. The desired processing tray would sometimes be searched for in vain when the tray was actually being used in another step. In such instance, some waiting time would be spent until the processing tray is made available. This is responsible for a further decline in production efficiency.

The facts noted above have proved to cause added cost and diminished efficiency when a plastic lens is produced for custom-made glasses.

In a first aspect of the present invention, there is provided an apparatus for the production of a plastic lens substrate by processing a plastic block material, which apparatus comprises a retainer for retaining a plastic block material, a holder for holding a processing tool, a storage unit for storing the processing tools to be used for grinding, smoothing and polishing, each of the processing tools having a processing end portion dimensioned to be smaller than the dimension of the block material, a manipulator for manipulating the processing tool and/or the block material, an actuator for causing the tool holder and/or the block material retainer to be actuated in such a manner that the processing tool and the block material are subjected to relative movement, and a control unit for controlling the actuator and/or the manipulator such that the block material is processed in a desired shape.

In a second aspect of the invention, there is provided a method of the production of a plastic lens substrate, which method comprises the steps of retaining a plastic block material on a processing material retainer, holding a processing tool on a tool holder, the processing tool having a processing end portion dimensioned to be smaller than the dimension of the block material, manipulating the processing tool and/or the block material operatively to thereby subject both of the same to relative movement such that the block material has a desired shape, and repeating the steps mentioned upon exchange of the processing tool for one for use in subsequent processing.

In a third aspect of the invention, there is provided a plastic lens substrate comprising a lens surface selected from the group consisting of a spherical surface, a toric surface, an aspherical surface, a progressive lens surface, a combination of aspherical and toric surfaces and a combination of progressive and toric surfaces, the lens substrate resulting from the production method of the second aspect.

In each of the three aspects stated above, the plastic block material may preferably be chosen from one of thermoplastic resins and thermosetting resins. The thermoplastic resins may be cellulose resins (such as celluloid, cellulose acetate, cellulose propionate, and cellulose butyrate), polyamide resins including aliphatic polyamide (such as 6-nylon, 6,6-nylon, and 12-nylon) and aromatic polyamide, polyolefins (such as ABS resin, AS resin, polystyrene, polyethylene and polypropylene), vinyl resins (such as polyvinyl chloride, polyvinylidene chloride, ethylene-vinyl acetate copolymer, and polyvinyl alcohol), saturated polyesters (such as polyacetal, polycarbonate, polyethylene terephthalate, and polybutylene terephthalate), aromatic polyesters, polyether ketone, polyether ether ketone, polysulfone, polyether sulfone, polyether imide, polyarylate, polymethyl pentene, ionomer, liquid crystal polymer, polyimide, fluoropolymer, polyphenyl sulfide, modified polyphenylene oxide or thermoplastic polyurethane. The thermosetting resins may be epoxy resin, unsaturated polyester, thermosetting polyurethane, polyimide, polymer of diethylene glycol bisallylcarbonate (CR-39), copolymer of bisphenol A or halogenated bisphenol A and diacrylate di(meth)acrylate, copolymer of bisphenol A or halogenated bisphenol A and urethane-modified di(meth)acrylate, or copolymer of a diacrylate compound or vinyl benzyl alcohol and an unsaturated thiol compound.

BRIEF DESCRIPTION OF THE DRAWING

The accompanying drawing illustrates, in a schematic elevation, one preferred form of the production apparatus according to the present invention.

DETAILED DESCRIPTION OF THE PREFERRED EMBODIMENTS

The production apparatus of the present invention will now be described below.

The drawing is a schematic elevation illustrative of the apparatus of the invention.

A plastic block material 1 is mounted in place on a retainer 2 located for retaining a processing material to be processed. In this embodiment, the block material 1 is placed on its convex side to adhesively fit the retainer 2 with use of a metal alloy of a low melting point. One side of the retainer 2 is designed to retain the processing material or block material 1, and the other side is securely attached to an axis that is coupled with a manipulator 3. The manipulator 3 acts to permit rotation of the retainer 2, and to this end, a motor or the like can be used.

The retainer 2 is movable in directions of X and/or Y and/or Z, and these movements are achievable by the action of an actuator 15. Though shown connected to the retainer 2 in the drawing, the actuator 15 may be united with the manipulator 3 in such a manner that the latter is allowed to move together with the manipulator 3.

Each of the manipulator 3 and the actuator 15 communicates with a control unit 16. The control unit 16 controls the manipulator 3, thereby controlling the number of revolutions and the speed of revolution in regard to the retainer 2 and also the on-off operation of the manipulator 3. Additionally, the control unit 16 controls the actuator 15, thereby controlling the X and/or Y and/or Z directions of movement, the distance of movement, the speed of movement and the on-off operation in regard to the retainer 2. In such instance, a computer is preferably used as the control unit 16. While in arrangement illustrated in the drawing, both of the manipulator 3 and the actuator 15 are connected to the one single control unit 16, separate control units may be arranged with respect to the manipulator 3 and the actuator 15.

A holder 5 disposed for holding a processing tool is positioned toward the side of the retainer 2 disposed for retaining the processing material or block material 1. The holder 5 is provided at one end thereof with a location for holding the processing tool and at the other opposite end with a manipulator 6. The manipulator 6 operates to enable axial rotation of the processing tool. For this operation, a motor, a high-frequency motor, an air spindle or the like can be employed.

The holder 5 is coupled with the actuator 15.

Here, the actuator 15 acts on the processing tool in respect of the X and/or Y and/or Z directions of movement, the distance of movement and the on-off operation as well as the inclination (θ) of movement.

The manipulator 6 is also coupled to the control unit 16. The control unit 16 acts to control the manipulator 6, thereby controlling the processing tool in respect of the X and/or Y and/or Z directions of movement, the distance of movement, the speed of movement and the on-off operation as well as the inclination (θ) of movement and the on-off operation of inclination. To this end, a computer-aided unit can be used. If the axis of θ is set at a degree of zero, then the processing tool actually works only at a region near to its top with consequential failure to attain a sufficient circumferential speed which could arise from rotation of the processing tool. Also adversely, such tool is liable to involve clogging or like inconvenience. For those reasons, the axis of e should be inclined in the practice of the present invention.

In the embodiment now described, those controls made via the manipulator 6 are performed by use of one control unit. When it is found desirable, individual control units may be arranged to effect the respective controls. On the other hand, the actuator 15 and the control unit 16 are arranged to actuate both of the retainer 2 and the holder 5 and to control the manipulators 3, 6 of these constituent parts. The actuator 15 and the control unit 16 may be held in separately operative relation to each other.

Disposed upwardly laterally of the block material 1 are an exhaust duct 12, a coolant-supplying hose 13 and a polishing liquid-supplying hose 14. Duct exhaust, coolant supply and liquid supply are all effected by use of a computer-aided motor which is capable of making the on-off operations and of controlling the extents of exhaust and supply.

A storage unit 17 for storing the processing tools is located adjacent to the tool holder 5. The storage unit 17 is constructed to accommodate a plurality of processing tools 7, 8, 9, 10, 11 of varying shapes, hardnesses and dimensions for adaptability to each of process steps of grinding, smoothing and polishing. During the processing operation, the holder 5 moves to arrive at the storage unit 17, thus selecting any necessary tool for subsequent processing as indicated diagrammatically by an arrow A. The operator's discretion is used in that selection.

Suitable processing tools for use in the grinding step include a ball end mill and an end mill, and eligible materials include diamond and ultra-hard material. Suitable processing tools for use in the smoothing step are chosen from electro-deposited whetstone and resin-bonded whetstone. Suitable processing tools for use in the polishing step are chosen from felt buff, a silicone rubber and a brush.

In implementing the present invention, the holder 5 and the retainer 2 may be allowed to move in the directions of X and/or Y and/or Z by movement of either one or both of the two constituent parts. Furthermore, the processing tool and the retainer 2 may be allowed to rotate by rotation of either one or both of the two parts.

According to the production method of the invention, rotation of the block material and/or the processing tool, movement of the block material and/or the processing tool, exchange of processing tools, local exhaust, and the supply of coolant and polishing liquid are achieved by means of computer control. As a consequence, fixing and removal of the block material are required to be effected only once. Lens processing from grinding to polishing is automatically feasible with use of one set of production apparatus.

Also advantageously, rotation of the block material and/or the lens, rotation of the tool, and movement of the tool are conducted through numerical control aided by a computer so that lens surfaces such as an aspherical surface, a progressive surface, a combination of aspherical and toric surfaces and so on can be processed at will, which lens surfaces have been found unattainable by the method of the prior art.

The present invention is suitable for the processing of plastic materials. Suitable plastic materials, especially for use as lens substrates in plastic glasses, may preferably be selected from one of thermoplastic resins and thermosetting resins. The thermoplastic resins may be cellulose resins (such as celluloid, cellulose acetate, cellulose propionate, and cellulose butyrate), polyamide resins including aliphatic polyamide (such as 6-nylon, 6,6-nylon, and 12-nylon) and aromatic polyamide, polyolefins (such as ABS resin, AS resin, polystyrene, polyethylene and polypropylene), vinyl resins (such as polyvinyl chloride, polyvinylidene chloride, ethylene-vinyl acetate copolymer, and polyvinyl alcohol), saturated polyesters (such as polyacetal, polycarbonate, polyethylene terephthalate, and polybutylene terephthalate), aromatic polyesters, polyether ketone, polyether ether ketone, polysulfone, polyether sulfone, polyether imide, polyarylate, polymethyl pentene, ionomer, liquid crystal polymer, polyimide, fluoropolymer, polyphenyl sulfide, modified polyphenylene oxide or thermoplastic polyurethane. The thermosetting resins may be epoxy resin, unsaturated polyester, thermosetting polyurethane, polyimide, polymer of diethylene glycol bis-allycarbonate (CR-39), copolymer of bisphenol A or halogenated bisphenol A and di(meth)acrylate, copolymer of bisphenol A or halogenated bisphenol A and urethane-modified di(meth)acrylate, or copolymer of a diacrylate compound or vinyl benzyl alcohol and an unsaturated thiol compound. The thermosetting resins include, in addition to heat-curable resins, photo-curable resins such as of an acrylic class and the like.

EXAMPLE 1

In this example, a plastic block material was processed to produce a plastic lens substrate.

A plastics-made semi-finished lens (a polymer of CR-39) that had been processed to define a convex surface thereon was fixed on a processing material retainer with the convex side directed downwardly.

By the term semi-finished lens is meant a lens substrate prepared for processing a concave side thereon on a custom-made basis and according to a certain specific lens formulation. Thus, the semi-finished lens is provided with a convex surface previously processed. In this example, a concave surface was processed with a radius of 100 mm in consideration of the lens formulation and the convex shape of the semi-finished lens.

Firstly, grinding was conducted. As a processing tool for grinding, use was made of an ultra-hard cutter, Spiral Cut (Item No. B2585, spherical shape of 6.0 mm in radius) manufactured by MINITOR Co., Ltd. This cutter was mounted on a tool holder.

By means of computer control, the cutter-carrying holder was caused to move in Z and X directions and to locate peripherally of the block material.

With a e axis inclined at 30 degrees, the lens was rotated at a speed of 4 rpm and the tool at 5,000 rpm. The block material was thereafter stock-removed with exhaust to a depth of about 3.0 mm in the Z direction, while the X axis was displaced at a speed of 2.80 mm/min from the periphery of the block material to the central direction. While in displacement of the Z axis, a concave surface of 100 mm in radius was processed.

Secondly, smoothing was conducted. Rotation of the tool used in grinding was brought to an end, and exhausting was also terminated. The axes of Z, X and e of the tool holder were displaced so that the tool holder was allowed to move to arrive where processing tools for exchange had been stored. Here, the tool holder was rendered open so as to disconnect the tool for grinding use.

As a processing tool for smoothing, a diamond-electrodeposited whetstone No. 120 (Item No. A3608, spherical shape of 6.0 mm in radius) manufactured by MINITOR Co., Ltd. was selected and mounted on the tool holder. The whetstone-carrying holder was caused to move in the Z and X directions and to locate peripherally of the block material. With the axis inclined at 30 degrees, the tool was rotated at a speed of 5,000 rpm. The block material was then stock-removed to a depth of 0.05 mm in the Z direction during supplying of water as a coolant, while the X axis was moved at a speed of 0.08 mm/min from the periphery of the block material to the central direction. While in displacement of the Z axis, a concave surface of 100 mm in radius was processed.

After smoothing was completed, rotation of the tool and supply of the coolant were terminated. The axes of Z and X of the tool holder were displaced and the axis of θ retracted, whereby the tool holder was allowed to move to arrive at a location in which processing tools for exchange had been stored. The tool for smoothing use was then disengaged from the tool holder.

As a processing tool for polishing, a felt buff of a soft type (Item No. E5518, spherical shape of 10 mm in radius) manufactured by MINITOR Co., Ltd. was selected and mounted on the tool holder. The buff-carrying holder was caused to move in the Z and X directions and to locate peripherally of the block material. With the θ axis inclined at 30 degrees, the block material was rotated at a speed of 4 rpm and the processing tool at 5,000 rpm. The block material was then stock-removed to a depth of 0.005 mm in the Z direction during supplying the polishing liquid Polipla 103A, commercially obtained from Fujimi Incorporated, while the X axis was moved at a speed of 36 mm/min from the periphery of the block material to the central direction. While in displacement of the Z axis, a concave surface of 100 mm in radius was processed.

Finally, rotation of the processing tool, rotation of the block material and supply of the polishing liquid were terminated. The axes of Z, X and e of the tool holder were displaced, and the tool holder was allowed to move to arrive at a location in which processing tools for exchange had been stored. The tool for polishing use was then disengaged from the tool holder. The block material was also removed from the processing material retainer. Thus, a series of grinding, smoothing and polishing operations were completed.

In the method of the present invention, all of the operations except for fixing and removal of the block material were automatically carried out, as illustrated in the above example, by means of computer-programmed control.

EXAMPLE 2

In this example, a plastic lens substrate provided with a toric surface thereon was produced. As a plastic block material, use was made of a semi-finished lens formed of the same material as in Example 1 and processed to define a convex surface of a given curvature. This semi-finished lens was placed on a processing material retainer.

Because this example pertained to a lens substrate having a toric surface thereon, the radii of a concave surface were set at 100 mm in a first axis and at 75 mm in a second axis orthogonal to the first axis with the shape of the semi-finished lens and the lens formulation taken in view.

To effect grinding, the same processing tool as used for grinding in Example 1 was chosen and mounted on a tool holder. The processing tool was displaced at Z and X axes and located peripherally of the block material. The tool holder was inclined at 30 degrees with respect to the perpendicular line extending from a lens forming surface of the semi-finished lens and then caused to rotate with such conditions of 4 rpm of the lens and 5,000 rpm of the tool. In this instance, the axis of Z was controlled to displace through the movement synchronized with the angle of rotation of the semi-finished lens such that a toric surface was processed. By this angle of rotation is meant the angle of the toric surface specified in accordance with the lens formulation.

In the same manner as in Example 1, grinding was conducted with exhausting. The semi-finished lens was stock-removed to a depth of about 3.0 mm by use of the processing tool, while the latter was moved at a speed of 2.80 mm/min from the periphery of the former to the central portion.

As regards subsequent process steps of smoothing and polishing, the procedures of Example 1 were followed except that curvatures were set to meet with the above requirements of the toric surface.

In the case where no curvature is useful in defining the lens forming surface, as in a progressive lens or the like, processing may be effected by controlling displacement of the Z axis through the movement synchronized with the angle of rotation of the semi-finished lens, thereby meeting with those free curvatures programmed by a computer or the like.

In the foregoing examples, a substrate to be subjected to grinding is a semi-finished lens which has not been adjusted in its diameter. However, the semi-finished lens can be processed on its edge face according to a certain piece of information that is made obtainable by counting a processable diameter of a lens substrate from the shape of a lens ready for attachment to glasses. This processing is commonly called chamfering. The chamfered lens is of a circular shape. Moreover, upon advance decision of the shape of a lens ready for mounting on glasses, edging can be conducted prior to grinding.

Processing tools for use in chamfering and edging may be those used for grinding. More desirably, however, a cylindrical processing tool may be used which is shaped to be straight at a portion disposed for contact with the end face of the semi-finished lens.

In order to gain polishing with greater precision, the polishing step alone can be effected with use of a separate apparatus. In this case, chamfering, grinding and smoothing are effected in one and the same apparatus and polishing alone in a second apparatus. Additionally, though dependent on the processing tools to be selected, the same set of processing tools is applicable to grinding, smoothing and chamfering.

The production method of the present invention can effect grinding, smoothing and polishing with only one cycle of fixing and removal of a processing material, thereby contributing to shortened processing time. In spite of the fact that the conventional method requires three separate apparatus for the three process steps, the method according to the invention causes such steps to be performed in one and the same apparatus and hence leads to saved equipment cost and reduced floor space. Further, saved storage space and saved preparation cost are attainable because processing trays are not necessary in the practice of the invention. This gives rise to reduced production cost of the processing material.

In addition, and advantageously, movement of a lens or a tool is conducted through numerical control aided by a computer or the like so that lens surfaces such as an aspherical surface, a progressive surface and the like are processable when desired, which lens surfaces have been found unattainable by the method of the prior art. The prior art method using processing trays makes it markedly difficult to process, because of the need for a larger number of processing trays, special lens formulations of more or less 10 diopters on a spherical surface and of more or less 4 diopters on a toric surface. The apparatus according to the invention has no need for such trays and has been found satisfactorily applicable to specific lens formulations.

What is claimed is:

1. An apparatus for the production of a plastic lens substrate for eyeglasses by processing a plastic block material, comprising:

a retainer constructed to retain a plastic block material;

a holder constructed to hold a processing tool;

a storage System which stores processing tools to be used in grinding, smoothing and polishing operations, each of the processing tools having a processing end portion dimensioned to be smaller than a dimension of the block material;

a manipulating system that manipulates at least one of the processing tool and the block material retainer for processing of the block material;

a driving system that actuates at least one of the tool holder and the block material retainer such that the processing tool and the block material are subjected to relative movement; and a control unit operative to numerically control at least one of the driving system and the manipulating system such that a surface of the block material is processed into a surface selected from the group consisting of an aspherical surface, a progressive surface, and a combination of aspherical and toric surfaces, wherein said driving system is operative to cause said tool holder to access said storage system to enable exchange of the tools to be used in the grinding, smoothing, and polishing operations.

2. An apparatus according to claim 1, wherein the apparatus is constructed to process plastic block material selected from thermoplastic resins and thermosetting resins.

3. An apparatus according to claim 2, wherein said thermoplastic resins and thermosetting resins are selected from the group consisting of: cellulose resins such as celluloid, cellulose acetate, cellulose propionate and cellulose butyrate; polyamide resins including aliphatic polyamide such as 6-nylon, 6,6-nylon and 12-nylon and aromatic polyamide; polyolefins such as ABS resin, AS resin, polystyrene, polyethylene and polypropylene; vinyl resins such as polyvinyl chloride, polyvinylidene chloride, ethylene-vinyl acetate copolymer and polyvinyl alcohol; saturated polyesters such as polyacetal, polycarbonate, polyethylene terephthalate and polybutylene terephthalate; aromatic polyesters; polyether ketone; polyether ether ketone; polysulfone; polyether sulfone; polyether imide; polyarylate; polymethyl pentene; ionomer; liquid crystal polymer; polyimide; fluoropolymer; polyphenyl sulfide; modified polyphenylene oxide; thermoplastic polyurethane; epoxy resin; unsaturated polyester; thermosetting polyurethane; polyimide; polymer of diethylene glycol bis-allycarbonate (CR-39); copolymer of bisphenol A or halogenated bisphenol A and di(meth)acrylate; copolymer of bisphenol A or halogenated bisphenol A and urethane-modified di(meth) acrylate; and copolymer of a diacrylate compound or vinyl benzyl alcohol and an unsaturated thiol compound.

4. A plastic lens substrate for eyeglasses comprising a lens surface selected from the group consisting of a spherical surface, a toric surface, an aspherical surface, a progressive surface, a combination of aspherical and toric surfaces and a combination of progressive and toric surfaces, the lens substrate resulting from a method comprising the steps of retaining a starting plastic block material on a processing material retainer, holding a processing tool on a tool holder, the processing tool having a processing end portion dimensioned to be smaller than the dimension of the block material, manipulating the processing tool and/or the block material to thereby subject both of the same to relative movement, and repeating the steps mentioned upon exchange of the processing tool for one for use in subsequent processing.

5. A method of producing a plastic lens substrate for eyeglasses comprising:

providing a processing material retainer, a processing tool storage system, and processing tools for grinding, smoothing, and polishing, each tool having a processing end portion dimensioned to be smaller than a plastic block material;

retaining the block material on the processing material retainer; and subjecting the block material successively to a grinding operation, a smoothing operation, and a polishing operation, each said operation including holding a corresponding processing tool on the processing tool holder and manipulating at least one of the processing tool holder and the processing material retainer to process the block material with the corresponding tool;

said method further comprising, between said grinding operation and said smoothing operation, moving the tool holder to the storage system to replace the grinding tool with a smoothing tool and moving the tool holder with the smoothing tool to position the smoothing tool for the smoothing operation and, between said smoothing operation and said polishing operation, moving the tool holder to the storage system to replace the smoothing tool with a polishing tool and moving the tool holder with the polishing tool to position the polishing tool for the polishing operation.

6. An apparatus for the production of a plastic lens substrate for eyeglasses by processing a plastic block material, comprising:

a retainer constructed to retain a plastic block material;

a holder constructed to hold a processing tool;

a storage system which stores processing tools to be used in grinding, smoothing and polishing operations;

a manipulating system that manipulates at least one of the tool holder and the block material retainer for processing of the block material;

a driving system that actuates at least one of the tool holder and the block material retainer such that the processing tool and the block material are subjected to relative movement; and a control unit operative to control at least one of the driving system and the manipulating system such that a surface of the block material is processed in accordance with a desired shape, said driving system being operative to cause said tool holder to access said storage system to enable exchange of the tools to be used in the grinding, smoothing, and polishing operations.

7. An apparatus for the production of a plastic lens for eyeglasses for eyeglasses by processing a plastic block, comprising:

a retainer constructed to retain a plastic block;

a tool holder constructed to hold a processing tool;

a manipulating system that manipulates the tool and the block via said tool holder and said retainer respectively;

a driving system that actuates the tool holder and the retainer such that the tool held by said holder and the block retained by said retainer are in contact with each other and subjected to relative movement; and a control unit operative to numerically control the driving system and the manipulating system such that the block is processed to form the lens; wherein said tool to be held by said holder comprises at least three tools including a tool for grinding, a tool for smoothing and a tool for polishing;

said control unit selects the tool for grinding to effect grinding on said block with the tool for grinding, automatically replacing, upon completion of the grinding, the tool for grinding with the tool for smoothing, to effect smoothing on the ground block with the tool for smoothing, and automatically replacing, upon completion of the smoothing, the tool for smoothing with the tool for polishing to effect polishing on the smoothed block with the tool for polishing.

8. An apparatus according to claim 7, wherein said control unit controls said driving system thereby controlling the processing tool with respect to X and/or Y and/or Z directions of said relative movement, said X, Y and Z directions being mutually perpendicular.

9. A method for producing a plastic lens, comprising:

retaining a plastic block on a retainer;

holding a tool for grinding on a tool holder;

effecting grinding on the block retained by the retainer, with the tool for grinding;

automatically replacing the tool for grinding with a tool for smoothing;

effecting Smoothing on the ground block, with the tool for smoothing;

automatically replacing the tool for smoothing with a tool for polishing; and effecting polishing on the smoothed block, with the tool for polishing.

10. An apparatus for the production of a plastic lens substrate for eyeglasses by processing a plastic block material, comprising:

a retainer constructed to retain a plastic block material;

a holder constructed to hold a processing tool;

a storage unit constructed to store processing tools to be used in chamfering, grinding and smoothing processes, each of the processing tools having a processing end portion dimensioned to be smaller than a dimension of the block material;

a manipulator constructed to manipulate the processing tool and/or the block material for processing of the block material;

a driver which causes at least one of the tool holder and the block material retainer to be actuated such that the processing tool and the block material are subjected to relative movement; and a control unit operative to control at least one of the driver and the manipulator such that the block material is processed in a desired shape.

11. A method for producing a plastic lens substrate for eyeglasses by processing a plastic block material, comprising:

retaining a plastic block material on a retainer;

holding a processing tool on a holder, said processing tool being selected from a tool used for chamfering, a tool used for grinding, and a tool used for smoothing, each of the processing tools having a processing end portion dimensioned to be smaller than a dimension of the block material;

manipulating at least one of the processing tool and the block material to effect relative movement between the processing tool and the block material such that the block material is processed to have a desired shape; and repeating the aforesaid operations after exchange of one said processing tool for another to effect further processing of the block material.

12. An apparatus for the production of a plastic lens substrate for eyeglasses by processing a plastic block material, comprising:

a retainer constructed to retain a plastic block material;

a holder constructed to hold a processing tool;

a storage unit constructed to store processing tools to be used in grinding and smoothing processes, each of the processing tools having a processing end portion dimensioned to be smaller than a dimension of the block material;

a manipulator constructed to manipulate at least one of the processing tool and the block material for processing of the block material;

a driver which causes at least one of the tool holder and the block material retainer to be actuated such that the processing tool and the block material are subjected to relative movement; and a control unit operative to control at least one of the driver and the manipulator such that the block material is processed in a desired shape.

13. A method for producing a plastic lens substrate for eyeglasses by processing a plastic block material, comprising:

retaining a plastic block material on a retainer;

holding a processing tool on a holder, said processing tool being selected from a tool used for grinding and a tool used for smoothing, each of the processing tools having a processing end portion dimensioned to be smaller than a dimension of the block material;

manipulating at least one of the processing tool and the block material to effect relative movement between the processing tool and the block material such that the block material is processed to have a desired shape; and repeating the aforesaid operations after exchange of one said processing tool for another to effect further processing of the block material.

14. A method according to claim 13, further comprising polishing the block material with an apparatus which is different from an apparatus that effects grinding and smoothing.

15. An apparatus for the production of a plastic lens substrate for eyeglasses by processing a plastic block material, comprising:

a retainer constructed to retain a plastic block material;

a holder constructed to hold a processing tool;

a storage unit constructed to store processing tools to be used in grinding, smoothing and polishing processes, each of the processing tools having a processing end portion dimensioned to be smaller than a dimension of the block material;

a manipulator constructed to manipulate at least one of the processing tool and the block material for processing of the block material;

a driver which causes at least one of the tool holder and the block material retainer to be actuated such that the processing tool and the block material are subjected to relative movement; and a control unit operative to control at least one of the driver and the manipulator such that the block material is processed to have a surface selected from the group consisting of a spherical surface, a toric surface, an aspherical surface, a progressive lens surface, a combination of aspherical and toric surfaces, and a combination of progressive and toric surfaces.

16. An apparatus according to claim 15, wherein the plastic block material is selected from thermoplastic resins and thermosetting resins.

17. An apparatus according to claim 16, wherein said thermoplastic resins and thermosetting resins are selected from the group consisting of: cellulose resins such as celluloid, cellulose accetate, cellulose propionate and cellulose butyrate; polyamide resins including aliphatic polyamide such as 6-nylon, 6,6-nylon and 12-nylon and aromatic polyamide; polyolefins such as ABS resin, AS resin, polystyrene, polyethylene and polypropylene; vinyl resins such as polyvinyl chloride, polyvinylidene chloride, ethylene-vinyl acetate copolymer, and polyvinyl alcohol; saturated polyesters such as polyacetal, polycarbonate, polyethylene terephthalate, and polybutylene terephthalate; aromatic polyesters; polyether ketone; polyether ether ketone; polysulfone; polyether sulfone; polyether imide; polyarylate; polymethyl pentene; ionomer; liquid crystal polymer; polyimide; fluoropolymer; polyphenyl sulfide; modified polyphenylene oxide; thermoplastic polyurethane; epoxy resin; unsaturated polyester; thermosetting polyurethane; polyimide; polymer of diethyleno glycol bis-allycarbonate (CR-39); copolymer of bisphenol A or halogenated bisphenol A and di(meth)acrylate; copolymer of bisphenol A or halogenated bisphenol A and urethane-modified di(meth)acrylate; and copolymer of a diacrylate compound or vinyl benzyl alcohol and an unsaturated thiol compound.

18. A method for producing a plastic lens substrate for eyeglasses, comprising:

retaining a plastic block material on a processing material retainer;

holding a processing tool on a tool holder, the processing tool having a processing end portion dimensioned to be smaller than a dimension of the block material;

manipulating at least one of the processing tool and the block material to effect relative movement between the processing tool and the block material such that the block material is processed in a desired shape; and repeating the aforesaid operations after exchange of the processing tool for another processing tool for use in subsequent processing, such that the block material is processed to have a surface selected from the group consisting of a spherical surface, a toric surface, an aspherical surface, a progressive lens surface, a combination of aspherical and toric surfaces, and a combination of progressive and toric surfaces.

19. The method according to claim 18, wherein the plastic block material is selected from thermoplastic resins and thermosetting resins.

20. The method of claim 19, wherein said thermoplastic resins and thermosetting resins are selected from the group consisting of: cellulose resins such as celluloid, cellulose accetate, cellulose propionate and cellulose butyrate; polyamide resins including aliphatic polyamide such as 6-nylon, 6,6-nylon and 12-nylon and aromatic polyamide; polyolefins such as ABS resin, AS resin, polystyrene, polyethylene and polypropylene; vinyl resins such as polyvinyl chloride, polyvinylidene chloride, ethylene-vinyl acetate copolymer, and polyvinyl alcohol; saturated polyesters such as polyacetal, polycarbonate, polyethylene terephthalate, and polybutylene terephthalate; aromatic polyesters; polyether ketone; polyether ether ketone; polysulfone; polyether sulfone; polyether imide; polyarylate; polymethyl pentene; ionomer; liquid crystal polymer; polyimide; fluoropolymer; polyphenyl sulfide; modified polyphenylene oxide; thermoplastic polyurethane; epoxy resin; unsaturated polyester; thermosetting polyurethane; polyimide; polymer of diethylene glycol bisallycarbonate (CR-39); copolymer of bisphenol A or halogenated bisphenol A and di(meth)acrylate; copolymer of bisphenol A or halogenated bisphenol A and urethane-modified di(meth)acrylate; and copolymer of a diacrylate compound or vinyl benzyl alcohol and an unsaturated thiol compound.

21. An apparatus for the production of a plastic lens substrate for eyeglasses by processing a plastic block material, comprising:

a retainer constructed to retain a plastic block material;

a holder constructed to hold a processing tool;

a storage unit constructed to store processing tools to be used in chamfering, grinding and smoothing processes, each of the processing tools having a processing end portion dimensioned to be smaller than a dimension of the block material;

a manipulator constructed to manipulate at least one of the processing tool and the block material for processing of the block material;

a driver which causes at least one of the tool holder and the block material retainer to be actuated such that the processing tool and the block material are subjected to relative movement; and a control unit operative to control at least one of the driver and the manipulator such that the block material is processed to have a surface selected from the group consisting of a spherical surface, a toric surface, an aspherical surface, a progressive lens surface, a combination of aspherical and toric surfaces, and a combination of progressive and toric surfaces.

22. A method for producing a plastic lens substrate for eyeglasses by processing a plastic block material, comprising:

retaining a plastic block material on a retainer;

holding a processing tool on a holder, said processing tool being selected from a tool used for chamfering, a tool used for grinding and a tool used for smoothing, each of the processing tools having a processing end portion dimensioned to be smaller than a dimension of the block material;

manipulating at least one of the processing tool and the block material to effect relative movement between the processing tool and the block material such that the block material is processed in a desired shape; and repeating the aforesaid operations upon exchange of the processing tool for another processing tool for use in subsequent processing, such that the block material is processed to have a surface selected from the group consisting of a spherical surface, a toric surface, an aspherical surface, a progressive lens surface, a combination of aspherical and toric surfaces, and a combination of progressive and toric surfaces.

23. An apparatus for the production of a plastic lens substrate for eyeglasses by processing a plastic block material, comprising:

a retainer constructed to retain a plastic block material;

a holder constructed to hold a processing tool;

a storage unit constructed to store processing tools to be used in grinding and smoothing processes, each of the processing tools having a processing end portion dimensioned to be smaller than a dimension of the block material;

a manipulator constructed to manipulate at least one of the processing tool and the block material for processing of the block material;

a driver which causes at least one of the tool holder and the block material retainer to be actuated such that the processing tool and the block material are subjected to relative movement; and a control unit operative to control at least one of the driver and the manipulator such that the block material is processed to have a surface selected from the group consisting of a spherical surface, a toric surface, an aspherical surface, a progressive lens surface, a combination of aspherical and toric surfaces, and a combination of progressive and toric surfaces.

24. A method for producing a plastic lens substrate for eyeglasses by processing a plastic block material, comprising:

retaining a plastic block material on a retainer;

holding a processing tool on a holder, said processing tool being selected from a tool used for grinding and a tool used for smoothing, each of the processing tools having a processing end portion dimensioned to be smaller than a dimension of the block material;

manipulating at least one of the processing tool and the block material to effect relative movement between the processing tool and the block material such that the block material is processed in a desired shape; and repeating the aforesaid operations upon exchange of the processing tool for another processing tool for use in subsequent processing, such that the block material is processed to have a surface selected from the group consisting of a spherical surface, a toric surface, an aspherical surface, a progressive lens surface, a combination of aspherical and toric surfaces, and a combination of progressive and toric surfaces.

25. A method according to claim 24, further comprising a step of polishing the block material with an apparatus which is different from an apparatus that effects grinding and smoothing.

26. A method of producing a plastic lens substrate for eyeglasses, comprising:

providing a plastic block material, a retainer, a processing tool storage system, and processing tools for grinding, smoothing, and polishing, each tool having a processing end portion dimensioned to be smaller than a dimension of the plastic block material;

retaining the block material on the retainer;

grinding the retained block material with the tool for grinding;

smoothing the ground material with the tool for smoothing; and polishing the smoothed material with the tool for polishing;

wherein said grinding, smoothing, and polishing are effected successively in the stated order with a single apparatus.

27. A method of producing a smoothed plastic lens substrate for eyeglasses, comprising:

providing a plastic block material, a retainer, a processing tool storage system, and processing tools for grinding and smoothing, each tool having a processing end portion dimensioned to be smaller than a dimension of the plastic block material;

retaining the block material on the retainer;

grinding the retained block material with the tool for grinding; and smoothing the ground material with the tool for smoothing;

wherein said grinding and smoothing are effected successively in the stated order with a single apparatus.

28. A method of producing a plastic lens substrate for eyeglasses, comprising:

providing a plastic block material, a retainer, a processing tool storage system, and processing tools for grinding and smoothing, each tool having a processing end portion dimensioned to be smaller than a dimension of the plastic block material;

retaining the block material on the retainer;

grinding the retainer block material with the tool for grinding; and smoothing the ground material with the tool for smoothing;

said grinding and smoothing being effected successively in the stated order with a single apparatus;

said method further comprising polishing the smoothed block material with an apparatus which is different from said single apparatus.

* * * * *